(12) United States Patent
Sowa

(10) Patent No.: US 7,239,946 B2
(45) Date of Patent: Jul. 3, 2007

(54) VEHICLES FAULT DIAGNOSTIC SYSTEMS AND METHODS

(75) Inventor: Michael A. Sowa, Clinton Township, MI (US)

(73) Assignee: General Motors Corporation, Detroit, MI (US)

( * ) Notice: Subject to any disclaimer, the term of this patent is extended or adjusted under 35 U.S.C. 154(b) by 435 days.

(21) Appl. No.: 10/972,854

(22) Filed: Oct. 25, 2004

(65) Prior Publication Data

US 2006/0089767 A1   Apr. 27, 2006

(51) Int. Cl.
*G01M 17/00* (2006.01)
(52) U.S. Cl. ........................................ 701/29
(58) Field of Classification Search .................. 701/29
See application file for complete search history.

(56) References Cited

U.S. PATENT DOCUMENTS 6,842,676 B2 * 1/2005 Rodriguez ................... 701/29
2003/0050747 A1 * 3/2003 Kamiya ........................ 701/33
2004/0204816 A1 * 10/2004 Dery ........................... 701/113

* cited by examiner

*Primary Examiner*—Thu V. Nguyen
(74) *Attorney, Agent, or Firm*—Laura C. Hargitt

(57) ABSTRACT

A method for diagnosis of a vehicle includes monitoring a first plurality of distributed sensor signals input to a first control unit, monitoring a second plurality of distributed sensor signals input to a second control unit, determining a first diagnostic trouble code (first DTC) at a first instant of time, determining a second DTC at a second instant of time, storing a first dataset in a first storage media and storing the second DTC in the first dataset. The second instant of time is within a predetermined time of the first instant of time. The first dataset corresponds to the first instant in time, and the stored first dataset is transferred to a remote fault-diagnostic module at a later instant of time. The first dataset includes the first DTC, a predetermined first group of sensor signals associated with either the first or second control unit, and the second DTC.

13 Claims, 13 Drawing Sheets

Date                          Time

DTCs: PCM - P0442, PCM - P1626, PCM - U1064, EBCM - C0550, BCM - B3031

| | |
|---|---|
| Ambient Air Temp. | 20 C |
| Elevation | 24348 cm |
| Latitude | 42.4919586181641 milli-arcseconds |
| Longitude | -83.5254898071289 milli-arcseconds |
| Windshield Wiper Switch | Off |
| Battery Voltage | 13.3V |
| Stop Lamp Switch | False |
| Extended Travel Brake Switch | False |
| Engine Coolant Temp. | 95°C |
| Engine Running Active | True |
| Inside Air Temp. | 23°C |
| Steering Wheel Angle | 0.5° |
| Power Mode | Run |
| Throttle Position | 33% |
| Transmission Estimated Gear | 4 th |
| Odometer | 29979 km |
| Vehicle Speed | 105 km/h |

VEHICLES FAULT DIAGNOSTIC SYSTEMS AND METHODS

FIELD OF THE INVENTION

This invention relates to fault diagnostic systems and methods for automotive vehicles. More particularly, this invention relates to such systems and methods which confirm the existence of a substantial fault from sensor data.

BACKGROUND OF THE INVENTION

In the field of automotive diagnostics, most automotive vehicles currently employ a distribution of electro-mechanical sensors for providing electronic inputs to an Electronic Control Unit (ECU), which typically includes a microprocessor and memory for processing embedded algorithms. For example, the Engine Control Module (ECM) performs such functions relating to proper operation of an engine and drive train of an automotive vehicle. A primary function of the ECM is the reduction of undesirable engine emissions, however ancillary tasks, such as environmental control, comfort controls, safety systems, etc, are also currently performed by additional ECUs.

Each sensor in a sensor suite typically measures a single desired metric that is associated with one of a plurality of various aspects of automotive vehicle operation. Examples of such metrics include, but are not limited to, temperature, airflow, fuel flow, throttle position, vehicle speed, vehicle transmission gearing, and exhaust emission characteristics. Each sensor in turn emits an electronic signal that is proportional to the individual metric being monitored.

While monitoring the plurality of electrical outputs from the plurality of sensors, the microprocessor calculates a plurality of output parameters that are applied to a plurality of servomechanisms. For example, the ECM performs this function for metering desired amounts of fuel and air, and for setting ignition timing. Transmission gearing ratios are controlled by a Transmission Control Module (TCM) in an ECM/TCM configuration or a Powertrain Control Module (PCM) as specified in SAE J1930.

During ordinary operation, the sensors transmit electrical signals that are within predetermined limits. This allows the Electronic Control Unit (ECU) to make necessary corrections to related parameters so as to restore sensor outputs to predetermined levels. When any one of the sensors transmits an electrical signal having a level that is not within predetermined limits, a fault is detected and an error signal generated, which error signal identifies the sensor that generated the fault condition as well as the nature of the fault. Considered collectively, the error signals are known as Diagnostic Trouble Codes (DTCs). Current automotive vehicles provide a standardized data transfer port to allow the microcomputer to export the DTCs to an external monitoring device for display to a servicing mechanic. By tracing a table of these DTCs, the mechanics ability to troubleshoot and correct a problem associated with current operation of the vehicle is enhanced.

In current vehicles, on-going data are provided to the Electronic Control Unit (ECU) and thus to the external monitoring device. In addition, some ECUs will store a Freeze Frame (regulatory requirement) or Failure Record. Thus, while current operating parameters may be readily available to identify current problems, intermittent problems are not readily isolated and repaired if the fault is not present during diagnostic monitoring by the mechanic. More specifically, there is currently no provision for storing relational sensor data both before and after a fault condition occurs nor is there a provision for storing relational sensor data from networked ECUs that are not currently detecting a DTC. Examples of such non-diagnosable faults are significant hesitations that may occur during acceleration from particular vehicle speeds or while the transmissions are at higher gear ratios. There is a need for systems and methods that address such issues with current ECUs.

BRIEF SUMMARY OF THE INVENTION

In an embodiment of the invention, a method for fault diagnosis of a vehicle includes monitoring, determining and storing. The monitoring includes monitoring a first plurality of distributed sensor signals in a first control unit and monitoring a second plurality of distributed sensor signals in a second control unit. The determining includes determining in the first control unit a first diagnostic trouble code (first DTC) at a first instant of time and determining in the second control unit a second DTC at a second instant of time. The second instant of time is within a predetermined time of the first instant of time. The storing includes storing a first dataset in a first storage media when the first DTC is determined. The first dataset includes the first DTC and a predetermined first group of the first plurality of sensor signals. The storing also includes storing the second DTC in the first dataset in the first storage media when the second DTC is determined. The stored first dataset is transferable to a remote fault-diagnostic module at a later instant of time to be analyzed.

In another embodiment of the invention, a system for vehicle fault diagnosis includes a data link, a plurality of electronic control units coupled to the data link and a recording module. The recording module is either coupled to the data link or incorporated within one of the plurality of electronic control units. Each of the electronic control units is capable of monitoring a corresponding plurality of distributed sensor signals and transmitting a corresponding fault trigger over the data link when a corresponding fault type is detected. The recording module includes a circuit capable of determining diagnostic trouble codes (DTCs) when corresponding fault triggers are received from any of the electronic control units. The circuit in the recording module is also capable of storing a first dataset in a first storage media. The first dataset includes plural DTCs determined from a corresponding plurality of fault triggers that are received between a first instant of time and a second instant of time. The second instant of time is within a predetermined time of the first instant of time.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 2 is a chart of an exemplary result displayable on an output display of a diagnostic tool.

DETAILED DESCRIPTION OF THE INVENTION

Figure 1:
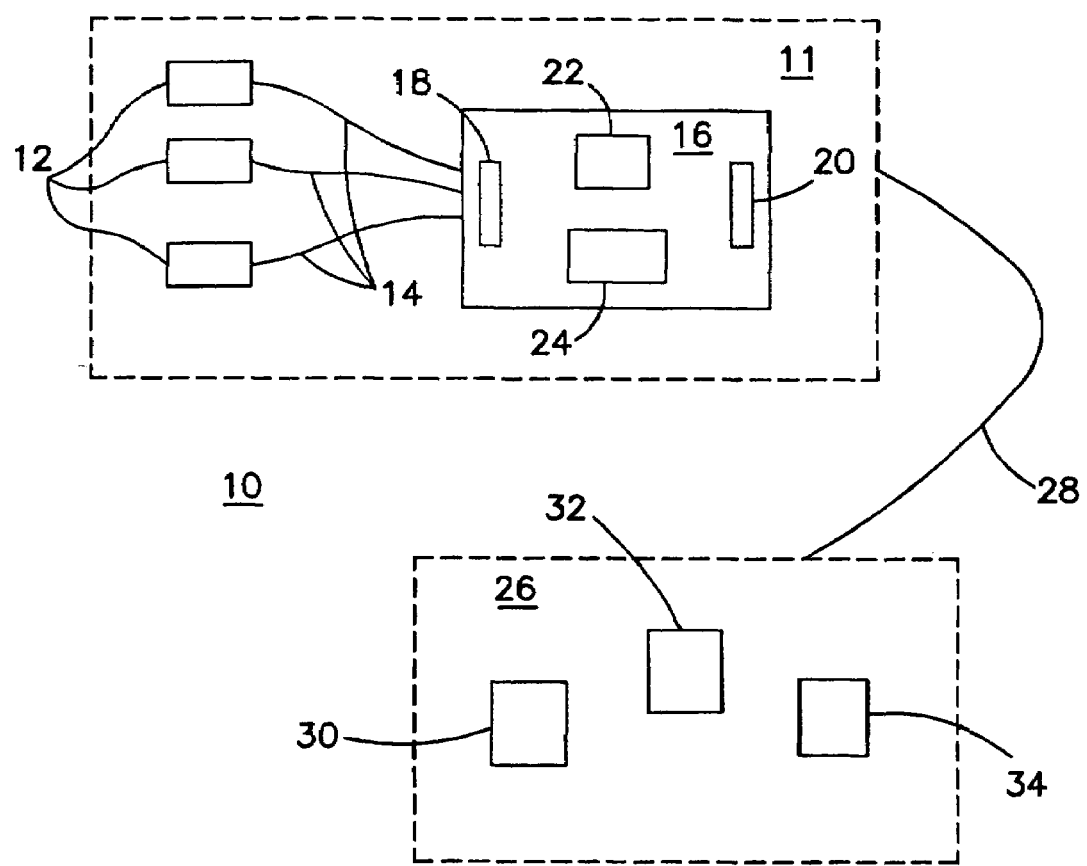
FIG. 1 is a block diagram of a preferred embodiment of a vehicle diagnostic system according the present invention.

For purposes of this specification, the following definitions apply:

dataset: a collection of two or more data signals and/or calculated data parameters recorded at a unique instant in time, originating either from one or more remote sensors, a remote Electronic Control Unit (ECU), or a microprocessor in an Electronic Control Unit (ECU);

data signals: an electrical signal proportional to a sensor metric, which can be either digital or analog in the routing/wiring connection to the ECU and preferably be converted to a digital signal for processing by the microprocessor;

microprocessor, microcomputer, ECU, and electronic control module are terms which may be used interchangeably to identify modules that provide computational processing capabilities. The system according to the embodiments of the present invention may incorporate a single Electronic Control Unit (ECU) that directly monitors a plurality of external sensors or it may incorporate a plurality of remote ECUs that each monitor a particular subset of the plurality of sensors and provide a composite data signal to a master ECU.

In an embodiment of present invention, a system and method is provided for automatically monitoring and storing a plurality of environmental metrics from a plurality of remote vehicle sensors monitored by a plurality of ECUs on a plurality of subnets upon detection of a fault condition. Such environmental metrics, occurring at a single first instant of time or during a predetermined period of time along with a plurality of output parameters calculated and/or generated by a microprocessor in an Electronic Control Unit, are stored, preferably semi-permanently stored, as a first dataset in a first storage medium for later retrieval by a diagnostic tool at a second instant of time. Preferably, a fault flag is set and stored to indicate that a fault condition has occurred. In practical applications, this fault flag may result in a "Malfunction Indicator Lamp" light being lit on a control panel. As an example, a particular fault condition might prescribe transfer and storage of an entire sensor dataset for a previous N ignition cycles. Thus, a plurality of data signals relating to the fault condition are available for later retrieval by a monitoring device for quickly and efficiently recreating the vehicle conditions at the time the fault occurred.

Multiple fault conditions generate successive datasets that are stored in successive storage locations. The first storage medium is preferably configured as a circular buffer, thereby allowing the first storage medium to be sequentially overwritten after a predetermined number of fault datasets have been recorded. For purposes of this invention, storage media may be either a volatile or a non-volatile memory device, and may be any one or more from a group of devices that includes a dynamic memory device (DRAM), a static memory device (SRAM) or a programmable memory device (EPROM, EEPROM, FLASH), removable magnetic media, and fixed magnetic media. While an ignition cycle may be used as the time period or timing interval for applications relating to an internal combustion engine, other periodicities may be used with other engine types employing teachings of the present invention.

Thus, each time a fault occurs, a fault dataset is stored in the first storage medium. When the number of fault datasets exceeds the amount of storage space available, a decision must be made to determine whether the most recently compiled fault dataset should be stored, and if so, which prior fault dataset must be discarded in order to make room in the first storage medium for the most recently compiled fault dataset.

In an example of how this decision is made, tables and/or algorithms are employed by a computing device to determine relative priorities for determining which fault datasets are to be retained and which fault datasets may be overwritten. Preferably, an overwrite flag would be set and stored to indicate that such fault dataset overwriting event has occurred. Under such an overwriting circumstance, it is preferable that the first fault dataset be retained, since that first fault may be presumed to potentially reveal the source of all successive faults, either directly or indirectly. Under such circumstances, the actual circular buffer of the first storage medium would preferably begin at the storage location of the second fault dataset. However, there may exist conditions where multiple DTCs are reported, which might dictate a different storage configuration depending on the predetermined priority of the particular DTCs.

The following monitored metrics are exemplary of but do not limit metrics under consideration in this application:

Date and Time: The date and time provide a time stamp of when a DTC(s) was detected. This information may be useful in the case of a DTC that sets at approximately the same time over the course of many days. It may also be useful for one-time events due to anomalous ambient conditions (e.g., an exceptionally heavy rain fall). The hours are preferably displayed using military notation (i.e., 0:00:01–24:00:00).

Diagnostic Trouble Codes (DTCs): The DTC data includes both the DTC number and the ECU that detected the DTC. The first DTC recorded is not necessarily the root cause of the malfunction because the condition may result in a behavior detected by another ECU, which is more quickly able to launch the DTC current message. The ECU reporting the DTC information may be useful in situations when the same DTC number is set by multiple ECUs.

Ambient Air Temperature: The ambient air temperature is the temperature outside of the vehicle. This information may be useful for intermittent DTCs that only set above or below a given temperature (e.g., stuck door lock motor below −5° C.).

Elevation: The elevation indicates the altitude of the vehicle referenced to sea level. This information may be useful for drivability concerns related to atmospheric pressure (e.g., runs rough driving through mountainous terrain).

Latitude and Longitude: The latitude and longitude specify the vehicle location at the time the fault occurred. This information may prove useful for intermittent conditions specific to the terrain (e.g., unwanted antilock brake system (ABS) activation due to brakes being applied and then driving over a bump).

Windshield Wiper Switch: The windshield wiper switch indicates whether the wipers were active when the fault occurs. This information may help to indicate that at DTC was induced by a water intrusion condition.

Battery Voltage: The battery voltage indicates the vehicle electrical system voltage. This is battery voltage when the engine is not running and charging system voltage when the engine is running. This information may help to indicate faults induced by out of range supply voltage conditions (e.g., DTC sets after starting and clears the current status when system voltage stabilizes.)

Stop Lamp Switch and Extended Travel Brake Switch: The stop lamp switch and extended travel brake switch together indicate how hard the brakes are being applied giving an indication of the magnitude of deceleration. This information may be useful for intermittent conditions due to something moving (e.g., wiring harness) and may provide an indication of the direction of this motion.

Engine Coolant Temp: The engine coolant temperature indicates the engine operating temperature and provides indirect information concerning how long the engine was running. This information may identify conditions that only occur at start up or conditions that occur after the vehicle has been operating for some amount of time.

Engine Running Active: The engine running status indicates whether the engine was running or not running. This provides a back up indication of the system power mode in case that signal fails and differentiates DTCs that only set when the engine is running versus a DTC that sets without regard to this condition.

Inside Air Temp: The inside air temperature indicates the temperature of the passenger compartment. This information may be useful for intermittent DTCs that only set above or below a given temperature that manifest when air conditioning (HVAC) is in operation (e.g., noise from mode doors.)

Steering Wheel Angle: The steering wheel angle indicates whether the condition occurred during a turning maneuver and gives an indication of the aggressiveness of the maneuver. This information may be useful for intermittent conditions due to something moving (e.g., wiring harness) and provides an indication of the direction of this motion.

Power Mode: The power mode indicates, in essence, the ignition switch position. Typically, diagnostic procedures are performed in the Run power mode with engine not running. This information may help in cases where the DTC sets in some other power mode but is not current in the Run power mode with engine not running (e.g., shorted PNP Switch causing the ECU to operate in the Run power mode regardless of the ignition switch position resulting in the ECU setting numerous Lost Communication DTCs).

Throttle Position: The throttle position indicates how much throttle is being requested by the vehicle operator giving an indication of the magnitude of acceleration (in conjunction with vehicle speed). This information may be useful for intermittent conditions due to something moving (e.g., wiring harness) and may provide an indication of the direction of this motion.

Transmission Estimated Gear: The transmission estimated gear indicates which gear is engaged. This may help to indicate abnormal operating conditions causing a DTC to set (e.g., vehicle speed=85 mph, throttle position=100%, transmission gear=2nd gear).

Odometer: The odometer indicates the accumulated distance traveled. This parameter provides an estimate of vehicle age. This may help indicate known conditions based upon vehicle aging (i.e. a particular 2.8 L engine may start leaking coolant around 40,000 miles).

Vehicle Speed: The vehicle speed indicates how fast the vehicle is moving. This parameter, in conjunction with other parameters, can help to more accurately describe how the vehicle was being operated at the time the DTC set.

During the creation of a dataset for a particular fault condition, some of the foregoing exemplary metrics may provide no value to the diagnostic process and thus may be omitted in order to save memory space. More particularly, most faults would only require a data signal from a subset of the plurality of sensors rather than the full complement. The selection of desired metrics to be included in the dataset may be controlled by a predetermined list that would be indexed by a control program according to a specific DTC that was generated.

In another embodiment of the present invention, a system and method is provided for automatically monitoring and temporarily storing a plurality of environmental metrics from a plurality of remote vehicle sensors on a continuous basis. For example, the plurality of environmental metrics from a plurality of remote vehicle sensors might be sampled and stored every 100 milliseconds. Such environmental metrics along with a plurality of output parameters calculated and/or generated by a microprocessor in an Electronic Control Unit are temporarily stored as a temporarily stored dataset. This temporarily stored dataset is retained while the communication network is monitored for the presence of a fault condition. In the absence of a fault condition, the temporarily stored dataset is overwritten by the next dataset that is generated in a next timing cycle. When and if a fault condition is detected, a subset of this temporarily stored dataset is transferred as a first fault dataset to a first storage medium and semi-permanently stored for retrieval at a later instant of time.

More generally, the first storage medium stores one or more fault datasets for retrieval at a later instant of time by a separate diagnostic module. Meanwhile, the Electronic Control Units temporarily store at least one temporarily stored dataset in a second storage medium. Upon an occurrence of a first fault condition, a subset of this temporarily stored dataset is transferred as a first fault dataset from the second storage medium to the first storage medium and semi-permanently stored for retrieval at a later time. Preferably, a fault flag would be set and stored to indicate that a fault condition has occurred. As before, in practical applications, this may result in a "Malfunction Indicator Lamp" light being lit on the control panel. An exemplary fault condition might prescribe the transfer and storage of an entire stored sensor dataset or a portion thereof, thereby making a plurality of data signals relating to the fault condition available for later retrieval by a diagnostic module for quickly and efficiently recreating the vehicle conditions at the time the fault occurred. For purposes of this invention, the first and second storage media may be incorporated either in a single device or multiple devices.

Upon detection of a second fault condition, a second fault dataset is transferred to the first storage medium and stored in a storage location in a manner similar to transferring data from the second storage medium to the first storage medium after detection of a first fault. Successive and sequential storage uses a circular buffer arrangement in the first storage medium. Thus, each time a fault occurs, a fault dataset is stored in the first storage medium. When the number of fault datasets exceeds the amount of storage space available, a decision must be made to determine whether the most recently compiled fault dataset should be stored, and if so, which prior fault dataset must be discarded in order to make room in the first storage medium for the most recently compiled fault dataset.

As an example of how this decision is made, tables and/or algorithms are employed by a computing device to determine relative priorities for determining which fault datasets are to be retained and which fault datasets may be overwritten by a next fault dataset. Preferably, a flag would be set and stored to indicate that such fault dataset overwriting event has occurred. Under such an overwriting circumstance, it is generally preferable that the first fault dataset be retained, since that first fault may be presumed to potentially reveal the source of all successive faults, either directly or indirectly. Under such circumstances, the actual circular portion of the circular buffer of the first storage medium would preferably begin at the storage location of the second fault dataset.

Referring to FIG. 1, another embodiment of the present invention is depicted as an arrangement 10 for vehicle fault diagnosis that includes a local stand-alone monitoring and recording system 11 having a plurality of sensors 12 for detecting physical metrics relating to operation of an automotive vehicle. The sensors 12 are connected by a plurality of interconnectors 14, to one or more Electronic Control Units (ECUs) 16. Each of the ECUs 16 includes an input port 18 for connection with the sensors 12 or to subordinate ECUs. An output port 20 communicates with at least one upstream microprocessor 22 or other computational device and at least a first storage device 24 for storing a control program software module, received data, and internally generated parameters. The microprocessor 22 includes a trigger operable upon the detection of a fault condition. A remotely connectable diagnostic module 26, is connected by a connecting cable 28 to the output port 20 of the ECU 16. The diagnostic module includes a computing device 30 for retrieving stored data from the Electronic Control Unit 16 and for running an included control program. The diagnostic module 26 includes a fault diagnostic software module 32 and a display device 34.

In operation, the monitoring and recording system 11 operates independently of the remotely connectable diagnostic module 26 to detect and to store fault conditions that occur during the operation of the automotive vehicle. The module 26 is employed by a service mechanic to diagnose service problems after the fact. Diagnosis is accomplished at a later instant of time by retrieving of the datasets stored in the storage medium in the ECU of the monitoring and recording system 11 and by then operating the diagnostic module 26 according to the fault diagnostic software module 32.

FIG. 2 is exemplary of a derived result displayed on the output display device 34 of diagnostic module 26. As is seen in FIG. 2, the particular DTC (for example "PCM-U1064") in conjunction with a "Throttle Position" of 33% and the "Transmission Estimated Gear" of $4^{th}$ gear indicates a very specific fault to be diagnosed and serviced. The steps of selecting a specific remedy to correct a specific detected condition can be in diagnostic computer software or in a related diagnostic or operational manual or in another computer program.

Figure 3:
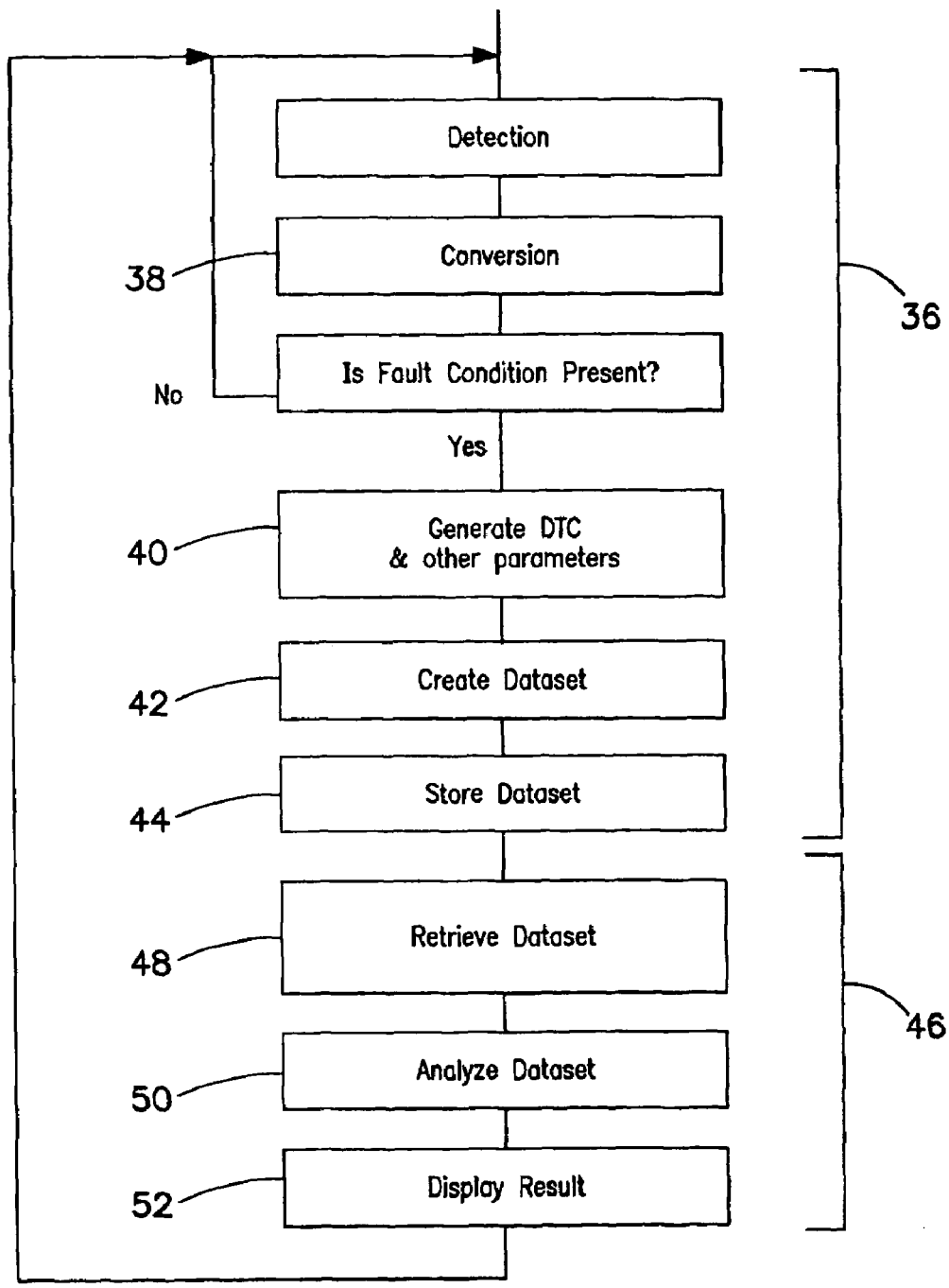
FIG. 3 is a flow chart diagram illustrating steps of a preferred embodiment of a vehicle diagnostic method according the present invention.

Referring now to FIG. 3, there is shown a flow chart setting forth steps of an embodiment of a diagnostic method according to the present invention. This method includes a detecting step 36 and a diagnostic step 46. Detecting step 36 includes detection of electrical signals from a plurality of remote distributed sensors located within the vehicle. If necessary, these signals are converted to a digital format at 38. If no fault condition is present, the detecting step 36 continues monitoring for a fault condition indicated by electrical signals from the plurality of remote distributed sensors located within the vehicle. On the other hand, if a fault is detected, a DTC and DTC current signal are generated at 40, electrical signals corresponding to the DTC are selected at 42, together with other identifying parameters that may be generated within the Electronic Control Unit related to the fault condition, and the DTC and selected electrical signals, together with the other identifying parameters that may be generated within the ECU are stored as a dataset in a storage media at 44. These electrical signals, plus DTC etc., are stored in the storage medium at a first instant of time if any fault condition is detected in any of the plurality of electrical signals. The detecting step 36 is repeated.

The diagnostic step 46 occurs at a later instant of time when a remote diagnostic module 26 is connected through a connection 28. The stored fault dataset(s) is retrieved from a connection port of the Electronic Control Unit into the diagnostic module 26 at the later instant of time at sub-step 48. The retrieved datasets are then converted to data at sub-step 50 according to the specific protocol used. The data is then displayed to the service technician at sub-step 52 who analyzes the data in order to determine a test and repair strategy. The cycle is then repeated.

Figure 4:
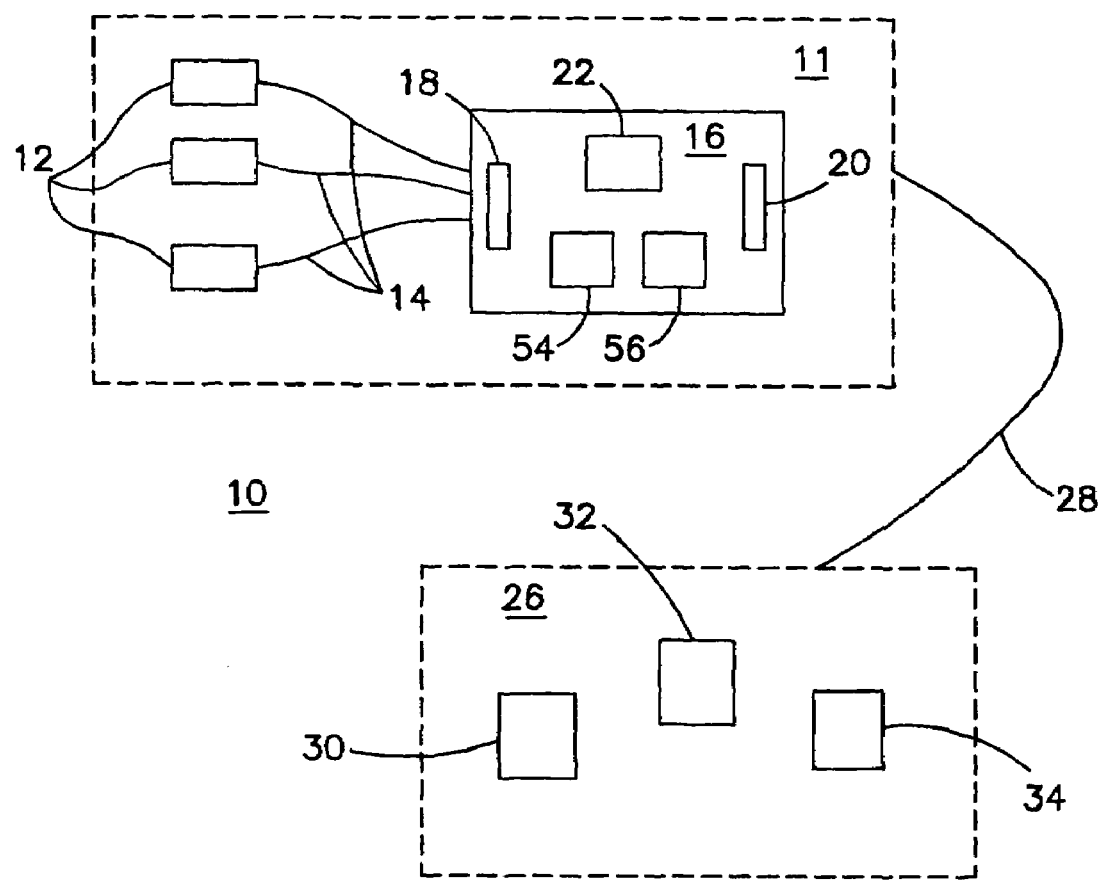
FIG. 4 is a block diagram of an alternate embodiment of a vehicle diagnostic system according the present invention.

FIG. 4 is a block diagram of another embodiment of the invention. In this embodiment, the diagnostic module 26 is similar to the embodiment depicted in FIG. 1, but the monitoring and recording system 11 depicted in FIG. 4 is different than the monitoring and recording system 11 depicted in FIG. 1. In the present embodiment, the monitoring and recording system 11 depicted in FIG. 4 includes at least a semi-permanent first storage medium 56 and a second temporary storage medium 54. The semi-permanent first storage medium 56 stores a control program software module, received data, internally computed parameters, various flags and a trigger generator module. The stand-alone diagnostic module 26 operates mostly independent of, and at a later instant of time than, the monitoring and recording system 11; however, module 26 includes circuitry to read data from the semi-permanent first storage medium 56. The trigger generator module detects fault conditions and triggers the storage of fault datasets in the semi-permanent first storage medium 56 when faults occur during the operation of the vehicle.

In normal operation, output data signals from the plurality of sensors 12 along with one or more parameters calculated in Electronic Control Unit 16 are stored in second temporary storage medium 54 as a dataset reflecting a most recent timing interval. This storing/recording operation is independent of the presence of a fault condition, and serves to have a pre-stored data record of the latest sensor readings in the event that a fault condition does occur. Then upon detection of a fault condition, the latest dataset is transferred as a semi-permanent dataset into the first storage medium 56, for later retrieval by diagnostic module 26. Second temporary storage medium 54 preferably serves as a temporary holding device for a single dataset record, and is continuously overwritten as each new dataset is generated in a successive time interval. First storage medium 56, however, is configured similarly to the first storage media 24 discussed with respect to FIG. 1. The first and second storage media 56 and 54, respectively, may be included in a same or a different storage device or medium. For example, the first storage medium 54 may be a DRAM memory device, while the second storage medium 56 might be an EPROM, FLASH, or a magnetic hard drive.

As in the embodiment discussed above with respect to FIG. 1, diagnostic module 26 is employed via a connection made by a servicing mechanic in order to diagnose service problems after the fact, by a delayed retrieving of the datasets stored in first storage medium 56 of local stand-alone monitoring and recording system 11.

Figure 5:
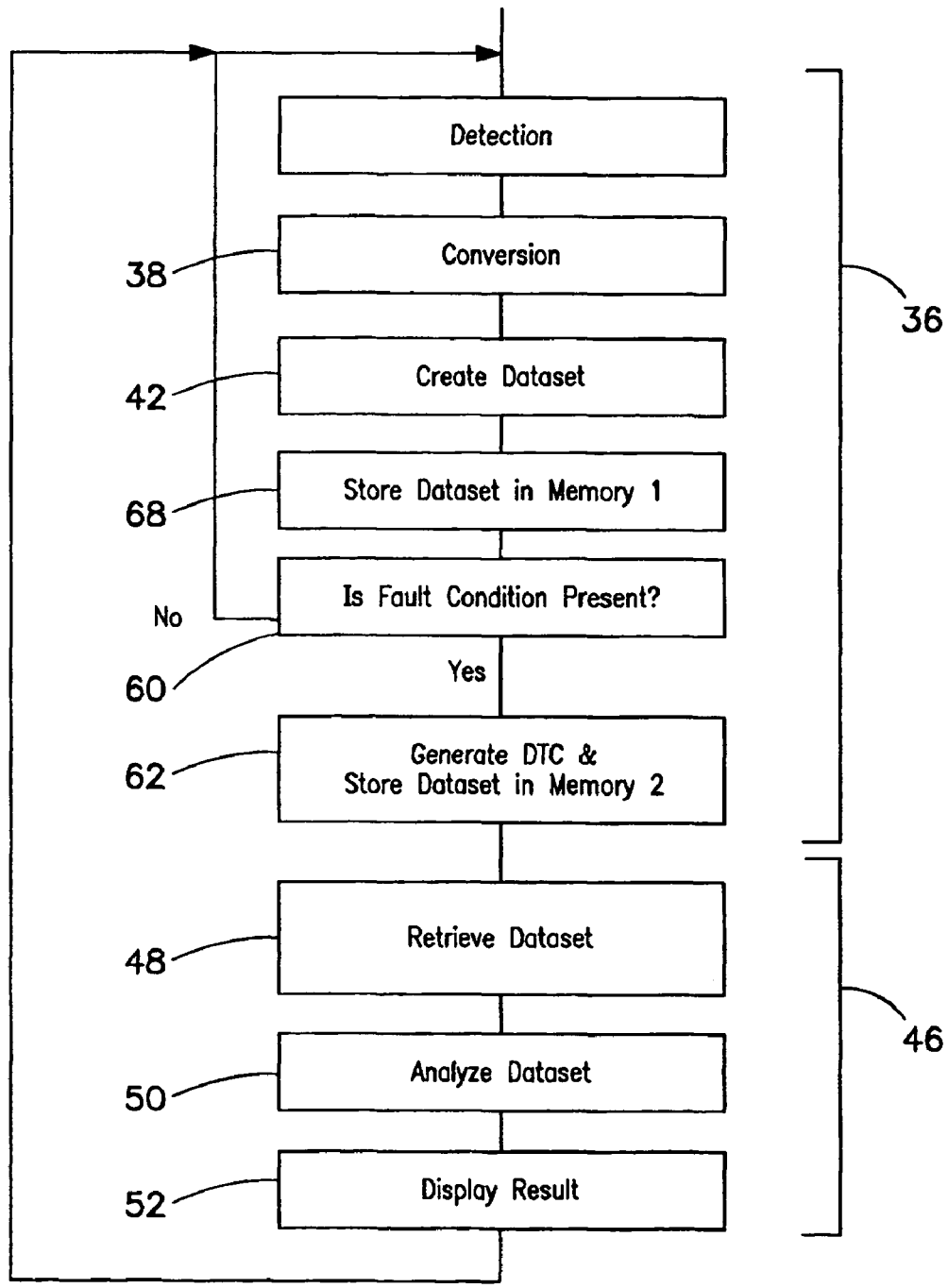
FIG. 5 is a flow chart diagram describing the steps of an alternate embodiment of a vehicle diagnostic system according the present invention.

FIG. 5 is a flow chart diagram illustrating the steps of another embodiment of a vehicle diagnostic method according the present invention. The present method includes a detecting step 36 that stores a fault dataset, if any, at a first instant of time in a first storage medium, and a diagnosing step 46 that reads, at a later instant of time, any datasets stored in the first storage medium. In FIG. 5, the detecting step 36 detects electrical signals from a plurality of remote distributed sensors located within the vehicle and, if necessary, converts the electrical signals to a digital format with a converter at 38, and stores one or more of the electrical signals as a dataset at 42 in a second storage medium at 58. At 42, each of the ECUs evaluates its respective input signals to detect a fault condition. If any of the plurality of electrical signals is at a value indicating a fault condition, one or more ECUs will detect the fault condition. The detecting step is repeated if no fault condition has been detected, thereby overwriting the previous dataset created at 42. If a fault condition has been detected, the detecting step 36 generates at 62 a DTC and transfers a subset of the dataset temporarily stored in the second storage medium 54 to the first storage medium 56 along with other identifying parameters that may be generated within the Electronic Control Unit, the other identifying parameters being related to the fault condition.

The diagnosing step 46 includes connecting the diagnostic module 26 to a connection port of the monitoring and recording system 11 and retrieving, at 48, the stored fault datasets. The stored fault dataset(s) is retrieved from the connection port of the Electronic Control Unit into the diagnostic module 26 at the later instant of time at sub-step 48. The retrieved datasets are then converted to data at sub-step 50 according to the specific protocol used. The data is then displayed, on a display device such as a video screen or print out, to the service technician at sub-step 52 who analyzes the data in order to determine a test and repair strategy. According to this embodiment, a single dataset is temporarily stored in the second storage medium 54, but periodically updated, for transfer to the first storage medium 56 upon the detection of a fault condition.

Another embodiment according to the present invention is similar to the embodiment shown in FIG. 4, but with the first storage medium 54 being capable of storing multiple datasets in a temporary manner. These multiple datasets are preferably monitored and stored in successive timing periods, so as to preserve and have present in memory a timed history of the signals from the plurality of sensors 12. Then, when a fault is detected, more than just the most recent dataset may be transferred from second storage medium 54 to first storage medium 56. Although this requires the second storage medium to be larger and typically more expensive, this additional data is for the purpose of allowing an additional diagnosis of events leading up to the fault condition for certain faults.

More particularly, the second storage medium has locations for storage of two or more datasets. In a first sampling period, environmental metrics along with a plurality of output parameters calculated and/or generated by a microprocessor in an Electronic Control Unit are temporarily stored as a first dataset in a first storage location in the second storage medium 54 for a predetermined period of time. A second dataset corresponding to a second sampling period is then temporarily stored in a second storage location of the second storage medium. Preferably, successive datasets are stored in successive storage locations of the second storage medium.

Such a second storage medium is preferable configured as a circular buffer, thereby allowing the second storage medium to be continually and sequentially over-written after a predetermined number of datasets have been recorded in the event that no fault occurs. Since the data has no value if no fault has occurred prior to the step of overwriting the oldest data, over-writing presents no difficulties.

This method for automotive fault diagnosis according to the present invention includes a detecting step 36 storing fault datasets in a first storage medium and a diagnosing step 46 reading fault datasets from the first storage medium. The detecting step 36 includes detecting electrical signals from a plurality of remote distributed sensors located within the vehicle, converting the electrical signals to a digital format if necessary, storing one or more of the electrical signals as a dataset in a second and temporary storage medium at a first instant of time, and determining if any of the plurality of electrical signals from the vehicle is in a fault condition. The detecting step 36 further includes repeating the above while no fault condition has been detected, storing a succeeding dataset in a next storage location, so as to not overwrite the previous dataset until the buffer is full. On the other hand, if a fault condition has been detected, the method further includes generating a DTC according to the type of fault detected, launching a DTC current message, and transferring a predetermined number of datasets from the second and temporary storage medium to the first storage medium, along with other identifying parameters that may be generated within the Electronic Control Units related to the fault condition.

The diagnosing step 46 includes connecting, at a later instant of time, a diagnostic module 26 to a connection port of the monitoring and recording system 11 and then retrieving the datasets stored in the first storage medium 56. The stored fault datasets are retrieved from the connection port of the Electronic Control Unit into the diagnostic module 26 at the later instant of time. The retrieved datasets are then converted to data according to the specific protocol used.

The data is then displayed to the service technician who analyzes the data in order to determine a test and repair strategy.

Related to the foregoing system and method is a set of prioritizing "rules" that are includable in the software control program module used at 50 (see FIG. 5). Such rules might include without limitation:

When the maximum number of records have been stored and the storing criteria are again met, the second oldest data is deleted to allow for storage of the most current information.

Once a dataset has been stored during an ignition cycle and the storing criteria are again met, another dataset is not stored. Only one dataset may be stored in any given ignition cycle.

Any DTCs indicated by a {network control—DTC current message} within this time period is associated with the same dataset up to the specified maximum number of DTCs.

The dataset is cleared when the ECU containing the dataset function receives a scan tool clear codes command, for example (Service $04/Mode $14) targeted to its physical address or to all nodes.

All datasets are cleared after 100 fault free ignition cycles.

The datasets are retrieved using the Service $1A using the Data Identifiers in the range of $tbd—$tbd or the Mode $3C using the Blocks in the range of $tbd—$tbd.

An empty (no data recorded) dataset is indicated by $0000 in bytes 1 and 2 (no DTC present in record) of the dataset or $0000 in data bytes 1 and 2 of the first Block of the dataset.

Figure 6:
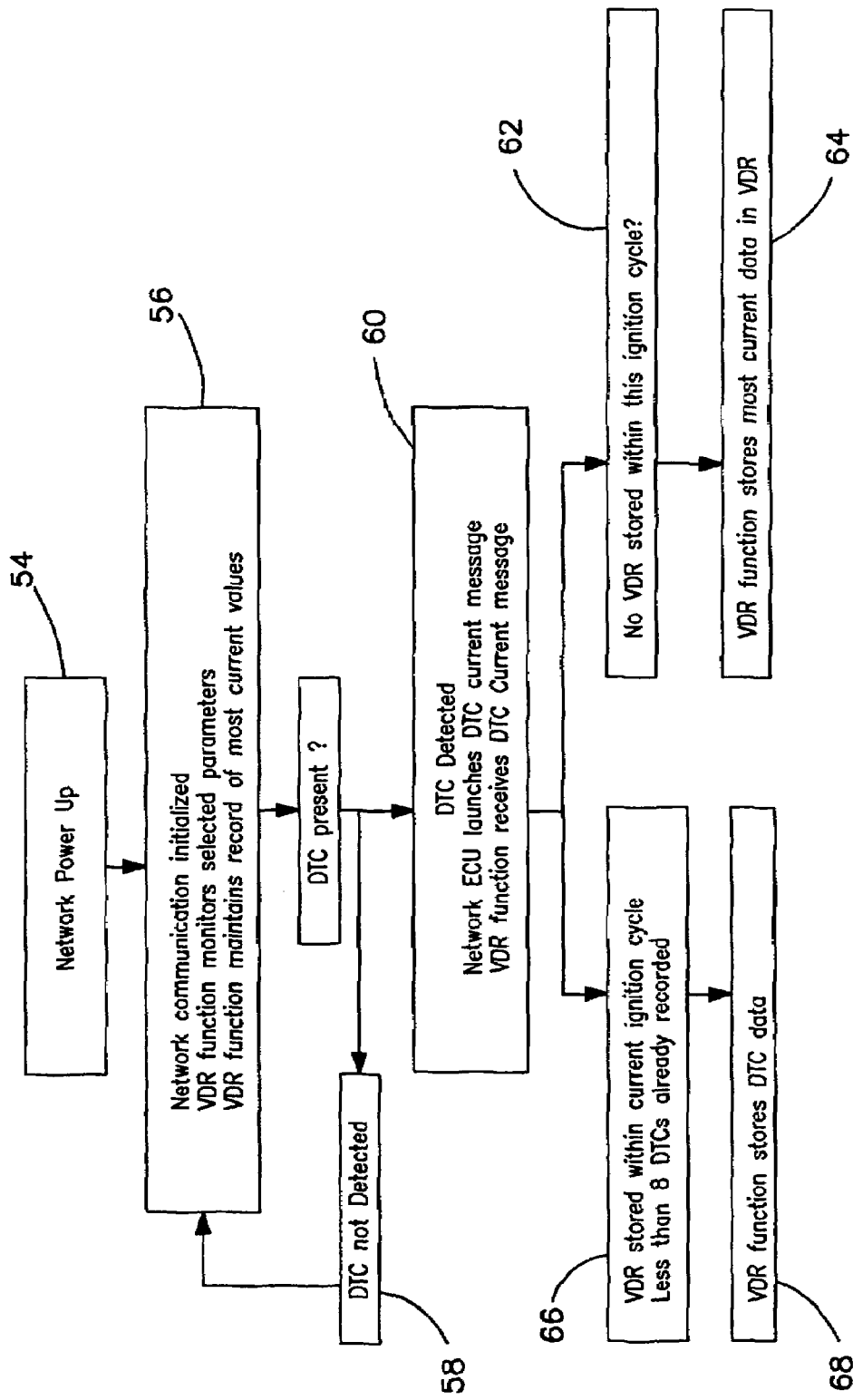
FIG. 6 is a block diagram of a data storage method according to a second alternate embodiment of the present invention.

In another embodiment of the foregoing methods for vehicle fault diagnosis, the detecting step 36 (of FIG. 5) for storing a dataset also includes steps as shown in FIG. 6. The monitoring and recording system 11 includes a network of Electronic Control Units 16. In FIG. 6, after power-up, at 54, system and network is initialized and a Vehicle DTC Record (VDR) function begins monitoring the network for selected parameters in step 56 (see FIG. 6). Typically, the VDR function is performed in one of the ECUs 16 in the network. The ECU 16 that has the most spare capacity in its processor, memory and network communication capabilities, is typically selected to be the site of the VDR function. The VDR function is then performed in a processor, microprocessor or the like and a corresponding program module in the selected ECU 16. As long as a DTC is not detected, the monitoring of the VDR function continues to repeat. If, however, a DTC is detected at 60, an ECU on a network launches a current DTC message, which is in turn received by the VDR monitoring function. The VDR monitoring function determines if a VDR has already been stored in a current timing period (e.g., the current ignition cycle). If it is determined at 62 that no VDR has been stored in the current timing period, the VDR, which includes the current DTC, is stored at 64 in a memory location.

If, however, it is determined at 66 that a VDR has already been stored for the current timing period, but that fewer than a predetermined number (e.g., 8) of DTCs have been stored within the VDR in the current timing period, the current VDR is updated with additional DTC information. An example of how it might be determined that a VDR has already been stored during the current timing period is that a software flag is set to signal when a VDR is stored.

Figure 7:
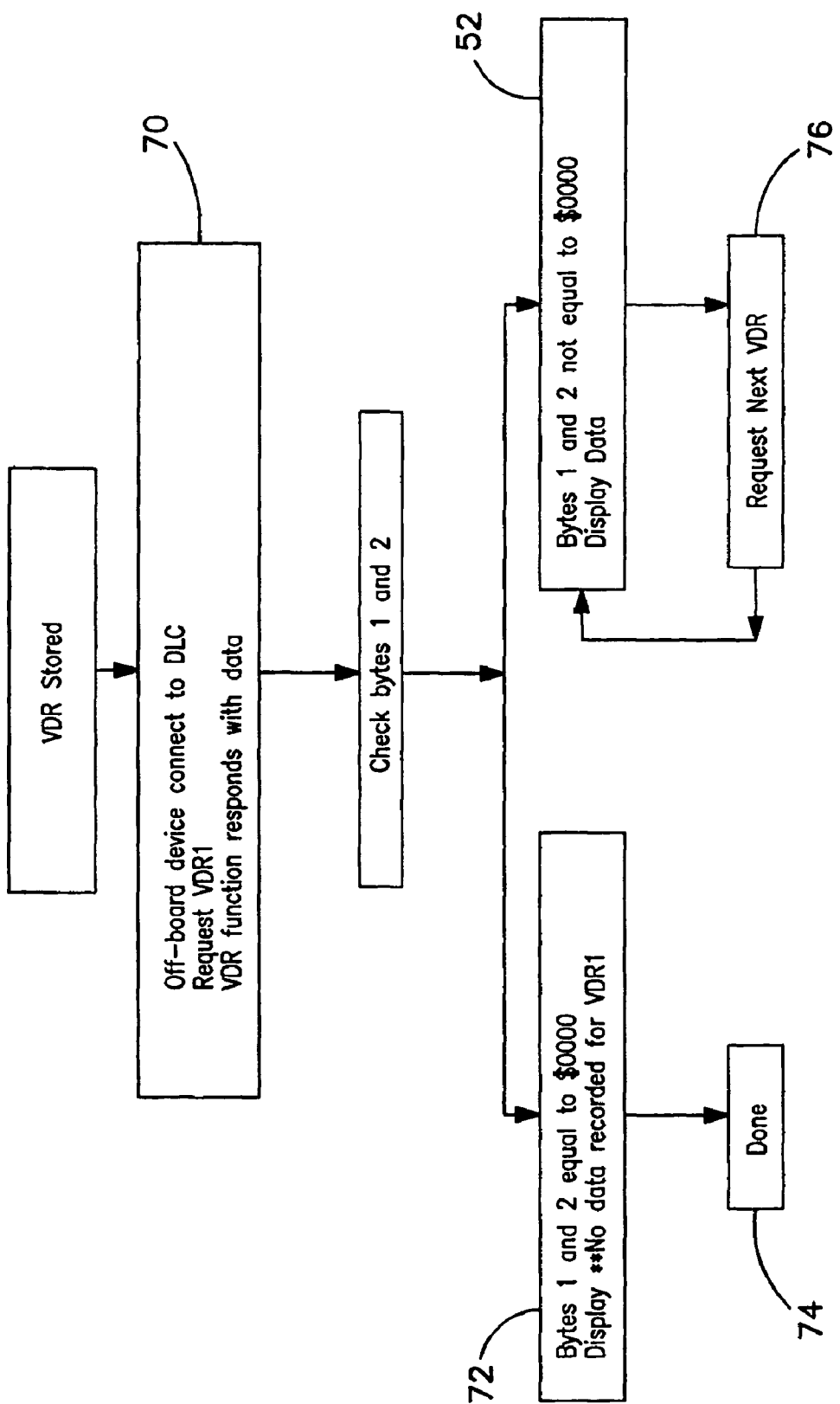
FIG. 7 is a block diagram of a data retrieval method according to the second alternate embodiment of the present invention.

Referring to FIG. 7, for the retrieval of the dataset as part of diagnostic step 46 of FIGS. 3 and 5, a diagnostic module 26 is connected to a VDR storage device and communication is established between the diagnostic module and the VDR storage device in order to initiate a request for and then the transfer of the previously stored data in step 70 of FIG. 7. The VDR storage device may include the first storage memory of a ECU 16 that "hosts" the VDR function. If exemplary indicator data bytes 1 and 2 equal $0000, the diagnostic module displays an exemplary message, such as "No data recorded for the VDR1" in a step 72, and the diagnostic procedure is ended in step 74. Alternatively, if exemplary indicator data bytes 1 and 2 are not equal to $0000, the data is displayed in readable format in step 52, and the control method provides for a new request for a next VDR, if any, in step 76.

Figure 8:
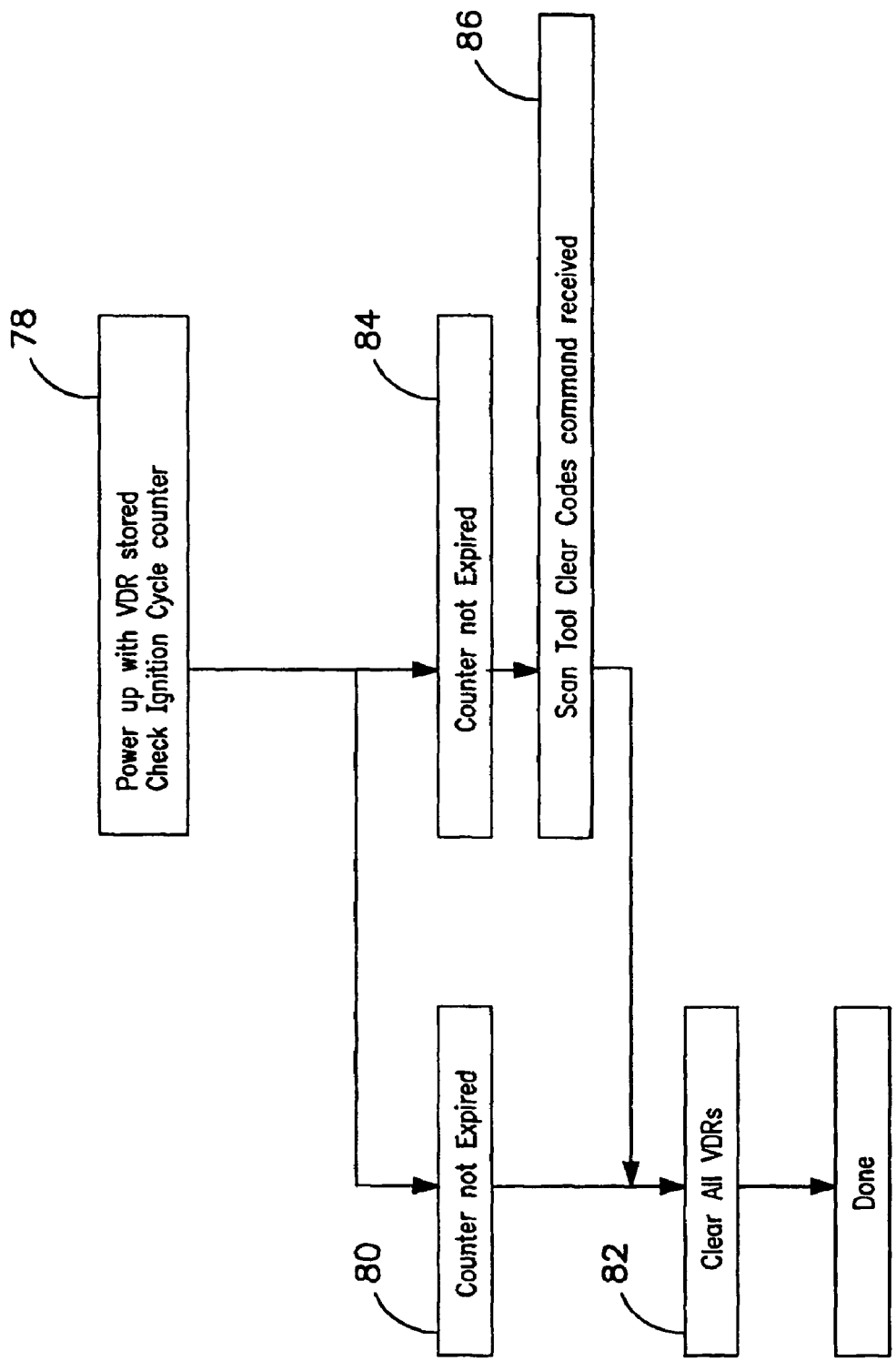
FIG. 8 is a block diagram of a memory clearing method according to the second alternate embodiment of the present invention.

FIG. 8 is a block diagram showing an exemplary method for erasing or clearing the storage device(s) of previously stored data. A fault free timing period count down counter counts down one step for each timing period (e.g., ignition cycle) that occurs without a fault condition. Whenever a fault is detected, the fault free timing period counter is preset to a predetermined maximum cycle count data value (e.g., 100). After power up with VDR data previously stored, in a step 78, the value stored in the fault free timing period count down counter is compared to zero to determine if a counter has expired. Other versions of fault free counters, such as count up counters, are suitable for use here to test a predetermined number of fault free cycles.

If the counter data value is determined to be "expired" in step 80, control is transferred to step 82 in order to clear the memory of all or part of the existing data. Alternatively, if the counter data value is determined to be "not expired" in step 84, a check is made in step 86 to determine if a "Clear DTCs" command has been received to clear the memory. If not, the clearing process is ended. Alternatively, if the "Clear DTCs" command has been received, control is transferred to step 82 in order to clear the memory.

In another embodiment of the invention, time is divided into record cycles. Typically, a record cycle is an ignition cycle. The ignition of the vehicle is turned off, then turned on and then it is turned off again. During the on phase of such a cycle, if a fault is detected, one data record of the fault is stored in a memory. Thus, in this typical example, the ignition cycle is called a record cycle. However, the record cycle may be defined as hourly (or some other predetermined period), and such epoch is electronically determined from an electronic clock. Alternatively, the record cycle may be defined as weekly (or some other predetermined period), and such epoch is electronically determined from an electronic calendar. Herein, the cycle is simply referred to as a record cycle or data record cycle.

Figure 12:
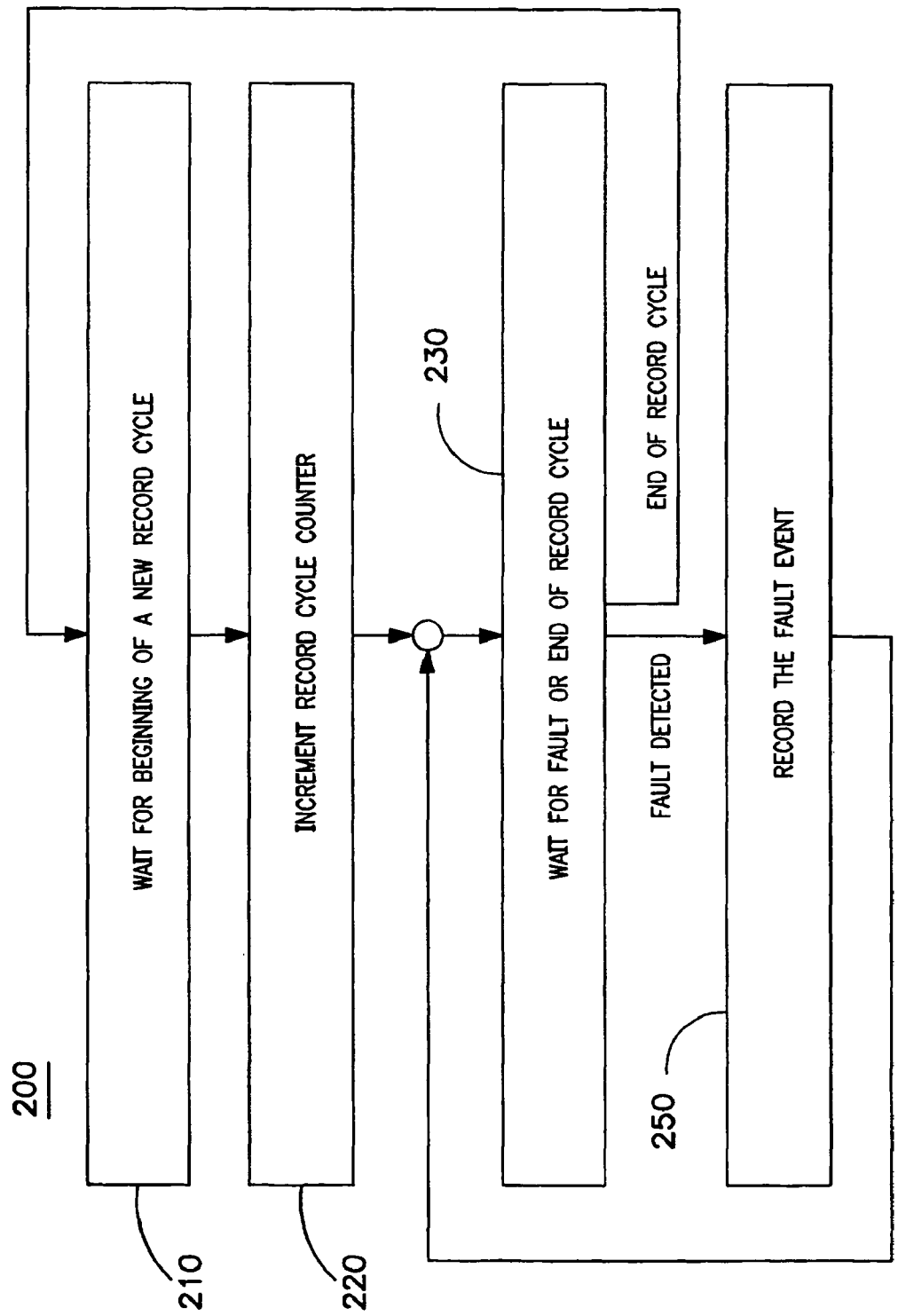
FIG. 12 is a block diagram of an exemplary method of fault diagnosis according to an embodiment of the invention.

A complete record cycle includes an "on" period (e.g., as when the ignition is on) and an "off" period (e.g., as when the ignition is off). As depicted in FIG. 12, the cycle 200 may be regarded as beginning by waiting at 210 for the beginning of a new record cycle. After the new record cycle begins (e.g., as when the ignition is turned on), a record cycle counter is incremented at 220, and the method enters a monitoring stage at 230 waiting for either a fault to be detected or for an end of record cycle to be detected. If a fault is detected during the process at 230, the fault event is recorded at 250 and the method continues by monitoring at 230 and waiting for either a fault to be detected or for an end of record cycle to be detected. On the other hand, if an end of record cycle is detected during the process at 230 (e.g., as when the ignition is turned off), the method continues by waiting at 210 for the beginning of a new record cycle.

Figure 13:
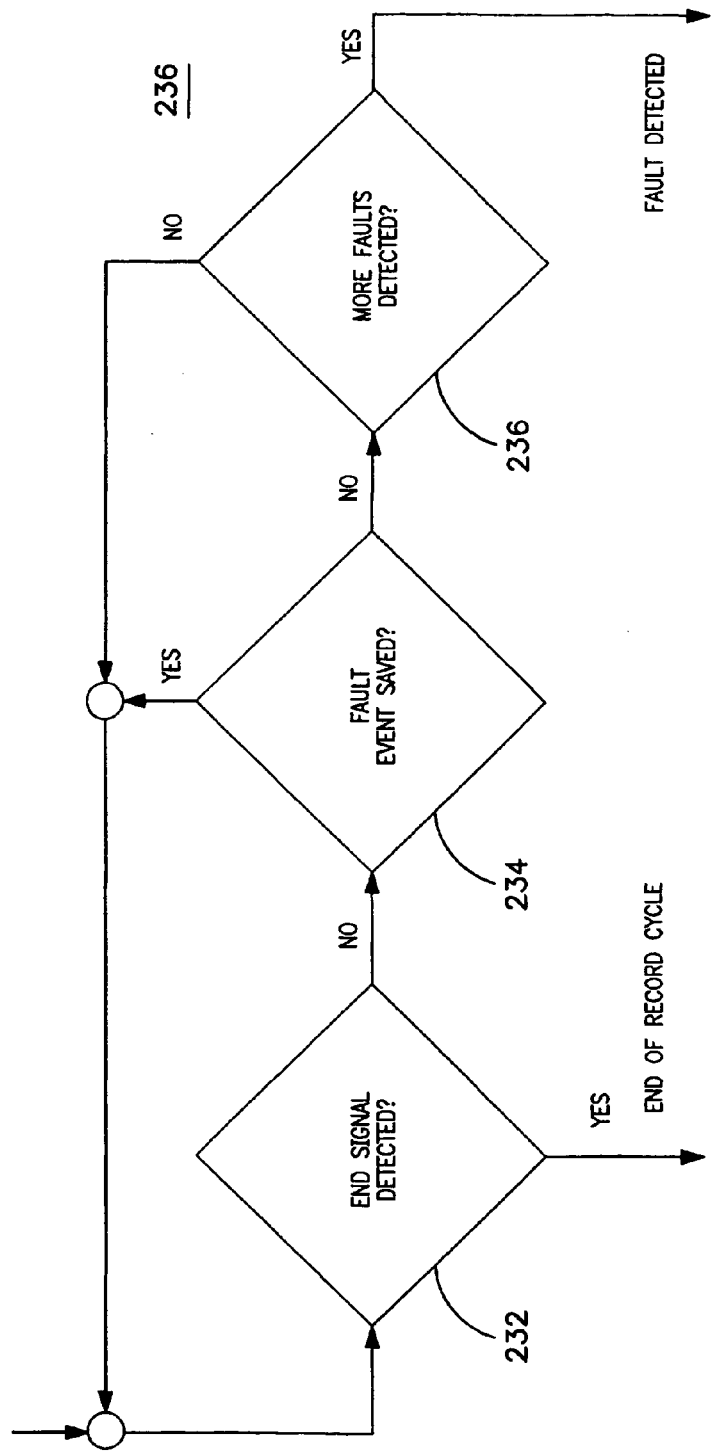
FIG. 13 is a block diagram of an example how the method step 230 of the method depicted in FIG. 12 might be implemented. Other implementations are equivalent.

FIG. 13 depicts an example of the process at 230, although other method may achieve the same function. In this example, the process at 230 begins by testing at 232 for the presence of a signal indicating the detection of an end of record cycle (e.g., as when the ignition is turned off), and if detected, then the process at 230 terminates as an "end of record cycle" (see FIG. 12). If the presence of a signal indicating the detection of an end of record cycle is not detected at 232, then the process at 230 tests at 234 to determine whether the fault event is completely saved. When the first fault is detected in any record cycle, a timeout timer is started. The timeout timer will expire after a predetermined time after the first fault is detected. This predetermined time might be set, for example, to be 15 seconds. Between the time the first fault is detected in any record cycle and the time the timeout timer expires, a fault record (e.g., a dataset) is prepared. Additional faults after the timeout timer expires (i.e., after the predetermined time expires) will not be recorded. A fault event has been completely saved, as tested at 234, after the timeout timer expires.

If a fault event has been completely saved, as tested at 234, then the process 230 continues by testing at 232 for the presence of a signal indicating the detection of an end of record cycle. If a fault event has not been completely saved, as tested at 234, then the process 230 continues by testing at 236 for the presence of additional detected faults to be accumulated in the fault record (e.g., the dataset). The cycle 200 continues by adding to the fault record (e.g., the dataset) until the predetermined time has expired.

Figure 9:
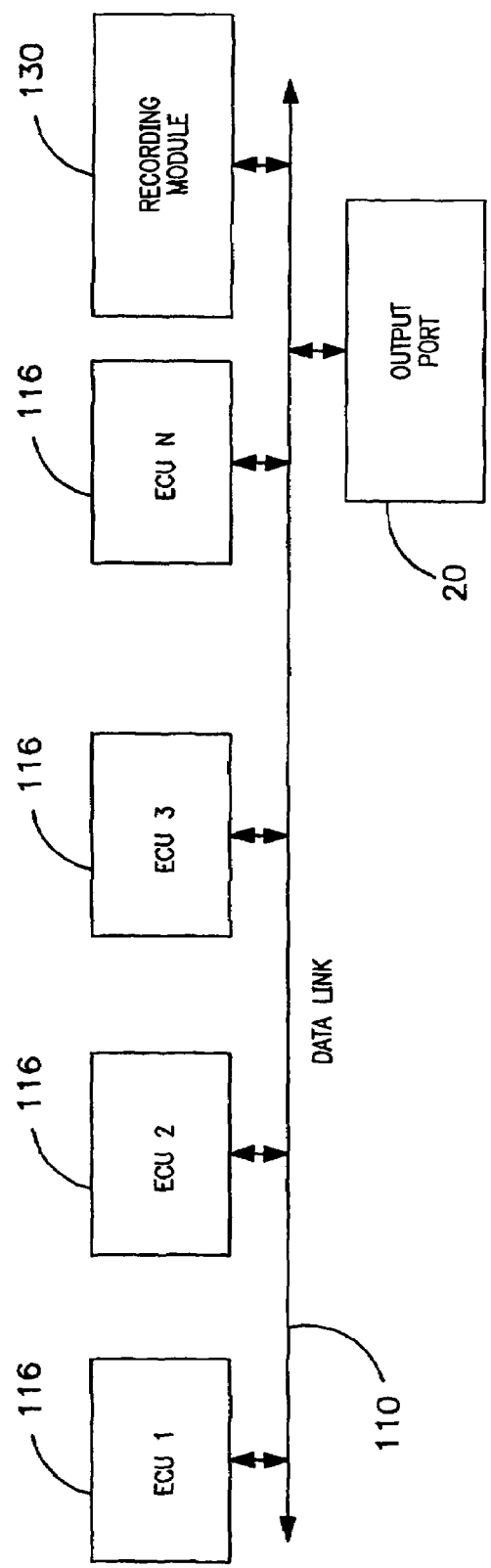
FIG. 9 is a block diagram of a system for vehicle fault diagnosis according to an embodiment of the invention.

Another embodiment is depicted in FIG. 9. In FIG. 9, a system for vehicle fault diagnosis includes a data link 110, two or more Electronic Control Units 116 coupled to the data link and an output port 20 through which a diagnostic module may be connected. The system also includes a recording module 130 coupled to the data link 110. Most implementations of the recording module use a microprocessor and one or more storage media such as processor 22 and storage medium 24 depicted in FIG. 1 or processor 22 and storage media 54 and 56 depicted in FIG. 4. Because of this, in one variant of the embodiment depicted in FIG. 9, the recording module 130 is not a separate module, but instead is part of one of the Electronic Control Units 116 that has sufficient extra capacity in the microprocessor and its network communication capacity and the one or more storage media to multi-task and implement both the ECU function and the Recording Module function.

In any of the variants of the embodiment depicted in FIG. 9, each of the Electronic Control Units are capable of monitoring a corresponding plurality of distributed sensor signals located in a vehicle in order to detect a presence of a corresponding fault type. This function is as described with respect to FIGS. 1 and 4. Each of the Electronic Control Units are also capable of transmitting a corresponding fault trigger over the data link 110 when a corresponding fault type is detected. Since the recording module 130 is intended to receive the trigger over the data link and then act accordingly, there is no need for an ECU that hosts the recording module's function to generate a trigger over the data link. The trigger and corresponding actions can be handled entirely within that particular ECU. In such a case, the system may use either the data linked trigger (over data link 110) or other internal processing (within the ECU) to bypass the need to send the trigger over the data link. The trigger indicates that a fault was detected and the type of fault (either the ECU type for single function ECUs or ECU type and fault type for multi-function ECUs).

The recording module (either part of an ECU or stand alone) includes a first storage media and a circuit capable of determining diagnostic trouble codes (DTCs) that corresponding fault triggers (or equivalent internal triggers) that are received from any of the electronic control unit. The recording module is also capable of storing a first dataset in the first storage media. The first dataset includes a first DTC based on a trigger received at a first instant of time and a predetermined first group of a plurality of distributed sensor signals associated with an operation of the vehicle. The first dataset also includes at least one more DTC determined from a corresponding trigger received at a second instant of time. The second instant of time is within a predetermined time of the first instant of time. Typically, the predetermined time is 15 seconds. This predetermined time serves to cutoff detected DTCs that are time wise distant from the first detected DTC while at the same time allowing several different ECUs to report faults in the fault dataset.

Figure 10:
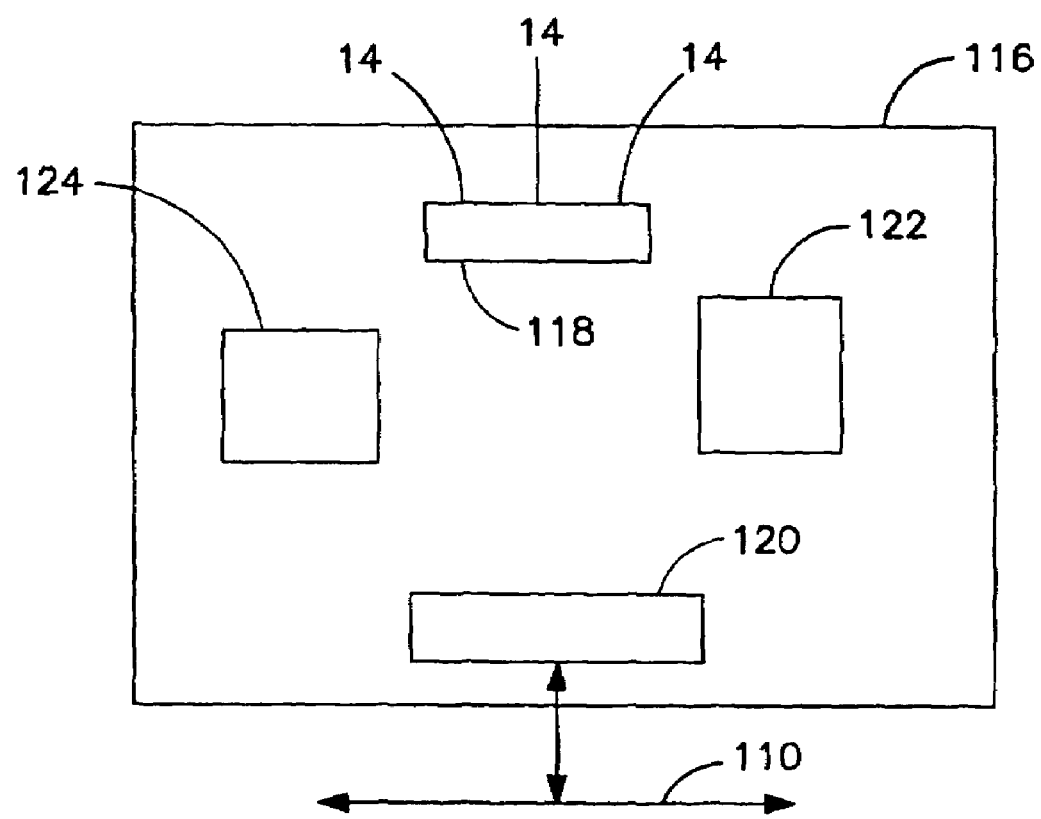
FIG. 10 is a block diagram of an exemplary Electronic Control Unit of FIG. 9.

A variant of the systems depicted in FIGS. 1 and 9 is depicted in FIG. 10. In FIG. 10, ECU 116 is similar to ECU 16 of FIG. 1 except output port 120 of ECU 116 enables communication over the data link 110 whereas output port 20 depicted in FIG. 1 provides communication with the diagnostic module 26. The embodiment of FIG. 9 and all of its variants provides communication with diagnostic module 26 by use of output port 20 (FIG. 9). Output port 20 in FIG. 9 communicates at one end with the diagnostic module 26 and at the other end communicates over data link 110 with the recording module 130 and the ECUs 116. Otherwise input port 118, processor 122 and storage medium 124 of FIG. 10 are substantially the same as input port 18, processor 22 and storage medium 24 of FIG. 1.

Figure 11:
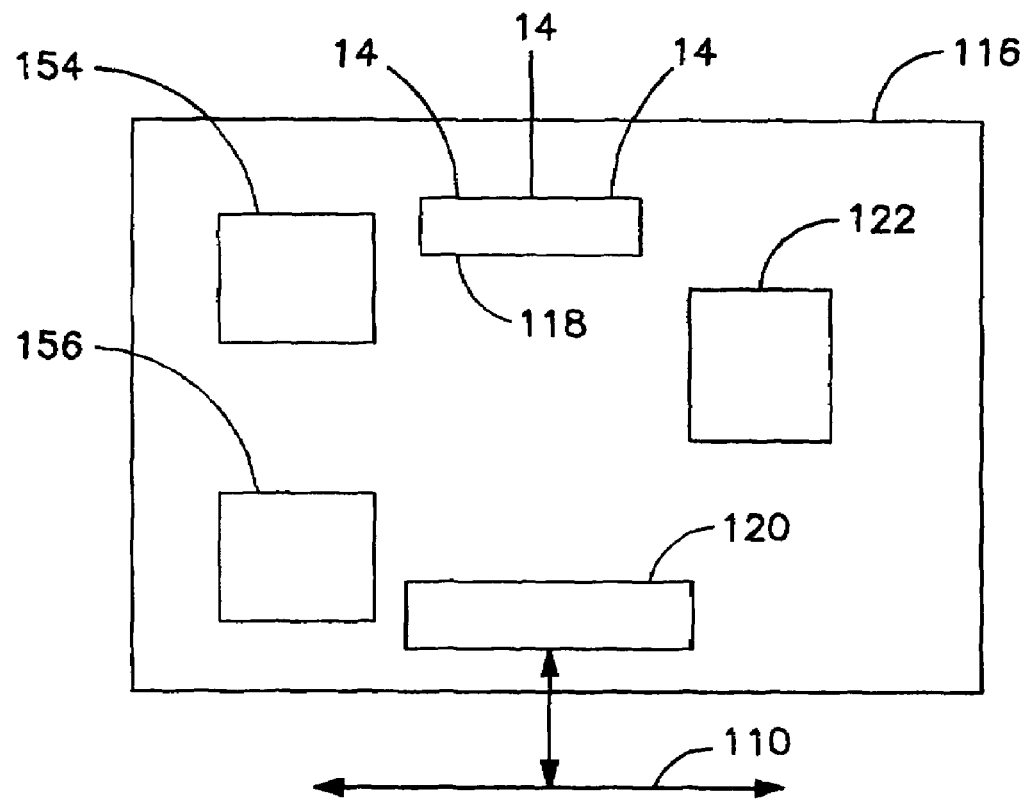
FIG. 11 is a block diagram of an alternative exemplary Electronic Control Unit of FIG. 9.

Another variant of the systems depicted in FIGS. 4 and 9 is depicted in FIG. 11. In FIG. 11, ECU 116 is similar to ECU 16 of FIG. 4 except output port 120 of ECU 116 enables communication over the data link 110 whereas output port 20 depicted in FIG. 4 provides communication with the diagnostic module 26. Otherwise input port 118, processor 122 and storage medium 124 of FIG. 10 are substantially the same as input port 18, processor 22 and storage medium 24 of FIG. 4.

In another embodiment, a method for fault diagnosis of a vehicle includes monitoring, determining and storing. The vehicle includes a first storage media storing a first dataset corresponding to a first instant in time. The stored first dataset is capable of being transferred to a remote fault-diagnostic module at a later instant of time for analysis. The monitoring includes monitoring a first plurality of distributed sensor signals in a first control unit in order to detect a presence of a first fault type and also monitoring a second plurality of distributed sensor signals in a second control unit in order to detect a presence of a second fault type. The determining includes determining a first diagnostic trouble code (first DTC) at the first instant of time when a first fault is detected by the first control unit, and determining a second DTC at a second instant of time when a second fault is detected by the second control unit. The second instant of time is within a predetermined time of the first instant of time, for example, 15 seconds. The predetermined time is selected to be a balance between a need to collect enough DTCs to properly diagnose the vehicle and a desire to minimize the required storage capacity of the first storage media as well as a desire to avoid false association of unrelated events. The storing includes storing the first dataset in the first storage media when the first DTC is determined. The first dataset includes the first DTC and a predetermined first group of the first plurality of distributed sensor signals. The first dataset also includes storing the second DTC in the first dataset in the first storage media when the second DTC is determined.

There are many variants of this process in which the first and second instants of time are times that occur within a first record cycle and further processes occur within a second or several more record cycles. In a first variant, the method further includes determining a third DTC at a third instant of time when a third fault is determined by either the first or second control unit and storing a second dataset in the first storage media when the third DTC is determined. In this first variant, the third instant of time occurs during a second record cycle. The second dataset includes the third DTC and a predetermined third group of sensor signals. The third group of sensor signals is selected from the first plurality of distributed sensor signals when the third DTC is detected by the first control unit and selected from the second plurality of distributed sensor signals when the third DTC is detected by the second control unit.

In one version of the first variant, the method further includes determining a fourth DTC at a fourth instant of time when a fourth fault is detected. The fourth instant of time is within a predetermined time of the third instant of time, for example 15 seconds. In this version, the fourth fault is detected by either the first control unit when the second control unit detects a fault at the third instant of time or the second control unit when the first control unit detects a fault at the third instant of time. In this version, the method further includes storing the fourth DTC signal in the second dataset in the first storage media when the fourth DTC signal is determined.

In another version of the first variant, the method further includes monitoring a third plurality of distributed sensor signals in a third control unit, determining a fourth DTC at a fourth instant of time when a fourth fault is detected and storing the fourth DTC in the second dataset in the first storage media when the fourth DTC is determined. The fourth instant of time is within a predetermined time of the third instant of time. The third plurality of distributed sensor signals are from sensors located in the vehicle. The third plurality of distributed sensor signals are input to a third control unit in order to detect a presence of a third fault type. The fourth fault is detected by the third control unit.

In a second variant of the embodiment, the method includes monitoring a third plurality of distributed sensor signals in a third control unit, determining a third DTC at a third instant of time when a third fault is detected by the third control unit and storing a second dataset in the first storage media when the third DTC is determined. In this second variant, the third instant of time occurs during a second record cycle. The third plurality of distributed sensor signals come from sensors located in the vehicle. The third plurality of distributed sensor signals are input to a third control unit in order to detect a presence of a third fault type. The second dataset includes the third DTC and a predetermined third group of the third plurality of distributed sensor signals associated with an operation of the vehicle.

In a first version of the second variant, the method further includes determining a fourth DTC at a fourth instant of time when a fourth fault is detected by either the first or second control unit and storing the fourth DTC in the second dataset in the first storage media when the fourth DTC is determined. The fourth instant of time is within a predetermined time of the third instant of time.

In a second version of the second variant, the method further includes monitoring a fourth plurality of distributed sensor signals in a fourth control unit, determining a fourth DTC at a fourth instant of time when a fourth fault is detected by a fourth control unit and storing the fourth DTC in the second dataset in the first storage media when the fourth DTC is determined. The fourth instant of time occurs within a predetermined time of the third instant of time. The fourth plurality of distributed sensor signals come from sensors located in the vehicle. The fourth plurality of distributed sensor signals are input to the fourth control unit in order to detect a presence of a fourth fault type.

In another variant of the embodiment where the first and second instants of time are within the first record cycle, the method includes erasing the first dataset from the first storage media when the monitoring of the first plurality of distributed sensor signals and the monitoring of the second plurality of distributed sensor signals determine a fault free operation of the first and second control units for a predetermined number of record cycles after the first record cycle. This self-correcting feature results from when the vehicle is operated through many record cycles. For example, the predetermined number of record cycles may be set to 50 or even 100. In this way, if the vehicle operates through 50 or 100 ignition cycles without further errors, the recorded fault dataset can be erased from the first storage media. If the detected fault that generated the first dataset was a false positive detection, then further records cycles will be fault free and the first dataset will eventually be erased.

In yet another variant wherein the first and second instants of time are within a first record cycle, the method further includes storing a plurality of subsequent datasets in the first storage media and storing a next dataset in the first storage media. Each subsequent dataset corresponds to a respective subsequently determined DTC occurring during a respective subsequent record cycle. The next dataset corresponds to a DTC occurring during a next record cycle that occurs after the subsequent record cycles that correspond to the plurality of subsequent datasets. However, the storing of a next dataset replaces one of the plurality of subsequent datasets with the next dataset when the number of datasets in the plurality of subsequent datasets exceeds a predetermined number, for example, eight. In this variant, the first detected DTC is stored in the first dataset and is not replaced until some external control such as a diagnostic tool 26 resets it or until the first dataset is erased after 50 to 100 fault free cycles. However, subsequent datasets accumulated during subsequent record cycles are stored in a cyclically revolving buffer. After a predetermined number, for example 8, of subsequent datasets have been stored, a next dataset replaces one of the subsequent datasets. But the first dataset is not replaced. In this way, when it comes time for the diagnostic tool 26 to readout the contents of the first storage media, the diagnostic tool 26 will have for analysis data associated with the first occurrence of a fault and data associated with the, for example eight, most recently occurring record cycles in which a fault occurred.

In still another variant of the embodiment, the monitoring of the first plurality of distributed sensor signals of this method includes periodically storing the first plurality of distributed sensor signals in a second storage media. The signals are stored in digital form. The period of this periodic storage is short, for example one-tenth of a second. However, the period may vary from being long enough to not burden communication on the data link 110 to short enough to have stored information relevant to any DTC that may be detected with minimal latency. Furthermore, the determining of a first DTC includes testing signals stored in the second storage media. The storing of the first dataset in the first storage media when the first DTC is determined includes selecting, or picking out, the predetermined first group from signals stored in the second storage media.

In a version of the preceding variant, the periodically storing of the first plurality of distributed sensor signals includes storing plural sets of the distributed sensor signals. Each set of the distributed sensor signals of the plural sets of distributed sensor signals corresponds to a respective period of time. In this way a short history of signals from which a fault can be detected is saved for later retrieval. For example, if 10 such sets of signals are stored, and it is only the most recently stored set of signals that generates a DTC condition, nevertheless, it is possible to observe the most recent 9 sets of signals that did not actually generate a DTC condition. In this version, a cyclical storage buffer is generated. The periodically storing of the first plurality of distributed sensor signals includes storing a next set of distributed sensor signals that are stored at a time after the plural sets of distributed sensor signals have been stored wherein the storing of a next set of distributed sensor signals replaces one of the plural sets of distributed sensor signals with the next set of distributed sensor signals. The next set of signals is regarded as, and becomes, one of the plural sets of signals after being stored in the second storage medium. Furthermore, the selecting of the predetermined first group includes selecting the plural sets of signals. Then, when the first DTC is stored with the predetermined first group of signals, the dataset will include not only the first DTC and the set of distributed sensor signals that is immediately responsible for the first DTC, there will also be stored a short history of the set of distributed sensor signals in the first predetermined group at times leading up to the DTC. The diagnostic tool 26 will be able to invoke more flexible filtering and analysis procedures.

In another embodiment of the invention, a system for vehicle fault diagnosis includes a data link, plural electronic control units coupled to the data link and a recording module. The recording module is either coupled to the data link or it is incorporated within one of the electronic control units. Each of the electronic control units are capable of monitoring a corresponding plurality of distributed sensor signals and transmitting a corresponding fault trigger over the data link when a corresponding fault type is detected. Each of the electronic control units of monitor a corresponding plurality of distributed sensor signals that are received from plural sensors located in the vehicle. The monitoring detects a presence of a corresponding fault type. The recording module includes a circuit that renders the recording module capable of determining diagnostic trouble codes (DTCs) when corresponding fault triggers are received from any of the electronic control units. The circuit also renders the recording module capable of storing a first dataset in a first storage media. The first dataset includes plural DTCs determined from corresponding plural fault triggers that are received between a first instant of time and a second instant of time. The second instant of time is within a predetermined time of the first instant of time, for example, 15 seconds.

In a variant of the above system embodiment, each of the electronic control units is further capable of periodically storing the corresponding plurality of distributed sensor signals in a second storage media and testing signals stored in the second storage media to determine whether to transmit the corresponding fault trigger over the data link. The distributed sensor signals that correspond to a particular electronic control unit are tested within the electronic control unit to determine whether a fault condition is present. If a fault condition is present, then the electronic control unit sends a fault trigger over the data link together with an identifier identifying which of the electronic control units generated the fault condition.

The electronic control unit is often, but not necessarily, mechanized as a microprocessor with a memory and various input/output devices. The second storage media is typically, but not necessarily, included in the electronic control unit as part of the memory. However, the memory is pressed into service for other reasons. The memory stores the program module that controls the microprocessor. It also stores other temporary storage needs of the microprocessor and it can be used to periodically store the plurality of distributed sensor signals that correspond to the particular electronic control unit. The various input/output devices include input devices for reading discrete signals such as whether the approximately 12 volt signal out of the ignition switch is on or off. The various input/output devices also include input devices for reading analog signals such as vacuum transducers (e.g., to read input manifold pressure) or temperature transducers (e.g., to read engine block temperature). Such input devices convert the analog voltage into a digital signal for storing in the memory. Another input/output device is a bus interface to couple the microprocessor to data link 110. However, the electronic control units may be implemented with application specific integrated circuits (ASICs), gate arrays or the like.

Each of the electronic control units is further capable of transmitting the corresponding plurality of distributed sensor signals over the data link when the corresponding fault trigger is transmitted. In operation, the electronic control unit monitors and periodically stores in the second storage media the plural sensor signals until a fault condition is detected. When a fault condition is detected, the electronic control unit sends the corresponding fault trigger over the data link together with the periodically stored plural sensor signals, or at least a predetermined group of the plural sensor signals. The circuit in the recording module is capable of storing the first dataset, where the first dataset includes at least the predetermined group of the first plurality of distributed sensor signals received over the data link and the corresponding one of the plural DTCs.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the embodiments may be varied without departing from the spirit of the invention, and the exclusive use of all modifications which come within the scope of the appended claims is reserved.

What is claimed is:

1. A method for diagnosis of a vehicle comprising:
monitoring a first plurality of distributed sensor signals in a first control unit;
monitoring a second plurality of distributed sensor signals in a second control unit;
determining in the first control unit a first diagnostic trouble code (first DTC) at a first instant of time;
determining in the second control unit a second DTC at a second instant of time, the second instant of time being within a predetermined time of the first instant of time;
storing a first dataset in a first storage media when the first DTC is determined, the first dataset including the first DTC and a predetermined first group of the first plurality of sensor signals; and
storing the second DTC in the first dataset in the first storage media when the second DTC is determined, the stored first dataset being transferable to a remote fault-diagnostic module at a later instant of time to be analyzed.

2. A method according to claim 1, wherein the first and second instants of time are within a first record cycle, the method further comprising:
determining a third DTC at a third instant of time when a third fault is detected by one of the first and second control units, the third instant of time being during a second record cycle;
storing a second dataset in the first storage media when the third DTC is determined, the second dataset including the third DTC and a predetermined third group of sensor signals, the third group of sensor signals being selected from the first plurality of distributed sensor signals when the third DTC is detected by the first control unit, the third group being selected from the second plurality of distributed sensor signals when the third DTC is detected by the second control unit, the stored second dataset being transferable to the remote fault-diagnostic module at the later instant of time to be analyzed.

3. A method according to claim 2, the method further comprising:
determining a fourth DTC at a fourth instant of time when a fourth fault is detected by the other of the first and second control units, the fourth instant of time being within a predetermined time of the third instant of time; and
storing the fourth DTC signal in the second dataset in the first storage media when the fourth DTC signal is determined.

4. A method according to claim 2, the method further comprising:
monitoring a third plurality of distributed sensor signals in a third control unit;
determining a fourth DTC at a fourth instant of time when a fourth fault is detected by the third control unit, the fourth instant of time being within a predetermined time of the third instant of time; and
storing the fourth DTC in the second dataset in the first storage media when the fourth DTC is determined.

5. A method according to claim 1, wherein the first and second instants of time are within a first record cycle, the method further comprising:
monitoring a third plurality of distributed sensor signals in a third control unit;
determining a third DTC at a third instant of time when a third fault is detected by the third control unit, the third instant of time being during a second record cycle; and
storing a second dataset in the first storage media when the third DTC is determined, the second dataset including the third DTC and a predetermined third group of the third plurality of distributed sensor signals, the stored second dataset being transferable to the remote fault-diagnostic module at the later instant of time to be analyzed.

6. A method according to claim 5, the method further comprising:
determining a fourth DTC at a fourth instant of time when a fourth fault is detected by one of the first and second control units, the fourth instant of time being within a predetermined time after the third instant of time; and
storing the fourth DTC in the second dataset in the first storage media when the fourth DTC is determined.

7. A method according to claim 5, the method further comprising:
monitoring a fourth plurality of distributed sensor signals in a fourth control unit;
determining a fourth DTC at a fourth instant of time when a fourth fault is detected by the fourth control unit, the fourth instant of time being within a predetermined time of the third instant of time; and
storing the fourth DTC in the second dataset in the first storage media when the fourth DTC is determined.

8. A method according to claim 1, wherein:
the first and second instants of time are within a first record cycle; and
the method further comprises erasing the first dataset from the first storage media when the monitoring of the first plurality of distributed sensor signals and the monitoring of the second plurality of distributed sensor signals determine a fault free operation of the first and second control units for a predetermined number of record cycles after the first record cycle.

9. A method according to claim 1, wherein the first and second instants of time are within a first record cycle and the method further comprises:
storing a plurality of subsequent datasets in the first storage media, each subsequent dataset corresponding to a respective subsequently determined DTC occurring during a respective subsequent record cycle; and
storing a next dataset in the first storage media, the next dataset corresponding to a DTC occurring during a next record cycle that occurs after the subsequent record cycles that correspond to the plurality of subsequent datasets, wherein the storing of a next dataset replaces one of the plurality of subsequent datasets with the next dataset when the number of datasets in the plurality of subsequent datasets exceeds a predetermined number.

10. A method according to claim 1, wherein:
the monitoring of a first plurality of distributed sensor signals includes periodically storing the first plurality of distributed sensor signals in a second storage media;
the determining of a first DTC includes testing signals stored in the second storage media; and
the storing of the first dataset in the first storage media when the first DTC is determined includes selecting the predetermined first group from signals stored in the second storage media.

11. A method according to claim 10, wherein:
the periodically storing of the first plurality of distributed sensor signals includes storing plural sets of the distributed sensor signals; each set of distributed sensor signals of the plural sets being stored at a respective period of time;
the periodically storing of the first plurality of distributed sensor signals includes storing a next set of distributed sensor signals that are stored at a time after the plural sets of distributed sensor signals have been stored; and
the storing of a next set of distributed sensor signals replaces one of the plural sets of distributed sensor signals with the next set of distributed sensor signals, the next set of signals being regarded as and becoming one of the plural sets of signals after being stored in the second storage medium; and
the selecting of the predetermined first group includes selecting the plural sets of signals.

12. A system for vehicle fault diagnosis comprising a data link, a plurality of electronic control units (ECUs) coupled to the data link and a recording module, wherein:
the recording module is one of the ECUs coupled to the data link and incorporated within one of the plurality of ECUs;
each of the ECUs is capable of monitoring a corresponding plurality of distributed sensor signals and transmitting a corresponding fault trigger over the data link when a corresponding fault type is detected;

the recording module includes a circuit capable of determining diagnostic trouble codes (DTCs) when corresponding fault triggers are received from any of the ECUs and capable of storing a first dataset in a first storage media, the first dataset including plural DTCs determined from a corresponding plurality of fault triggers that are received between a first instant of time and a second instant of time, the second instant of time being within a predetermined time of the first instant of time.

13. A system for vehicle fault diagnosis according to claim 12, wherein:

each of the ECUs is further capable of periodically storing the corresponding plurality of distributed sensor signals in a second storage media and testing signals stored in the second storage media to determine whether to transmit the corresponding fault trigger over the data link;

each of the ECUs is further capable of transmitting a first group of the corresponding plurality of distributed sensor signals over the data link when the corresponding fault trigger is transmitted;

the circuit in the recording module is further capable of storing the first dataset so as to include at least the first group of the first plurality of distributed sensor signals received over the data link and corresponding to one of the plural DTCs.

* * * * *